United States Patent [19]

Frame

[11] 3,778,642

[45] Dec. 11, 1973

[54] REGENERATIVE SWITCHING CIRCUIT

[75] Inventor: Robert Michael Gray Frame, Kanata, Ontario, Canada

[73] Assignee: Bell-Northern Research Ltd., Ottawa, Ontario, Canada

[22] Filed: Apr. 17, 1973

[21] Appl. No.: 352,042

[52] U.S. Cl. ......... 307/268, 178/70 TS, 179/170 T, 307/264, 328/164

[51] Int. Cl. ......................... H03k 5/01, H04b 3/58

[58] Field of Search .................... 307/263, 264, 268, 307/208, 290; 328/162, 164; 178/70 R, 70 TS; 179/170 C, 170 J, 170 T, 170 HF, 175.31 R

[56] References Cited

UNITED STATES PATENTS

| | | | |
|---|---|---|---|
| 2,759,047 | 8/1956 | Meacham | 328/164 X |
| 2,953,641 | 9/1960 | Carver | 178/70 R |
| 3,390,283 | 6/1968 | Hannigsberg | 328/164 X |
| 3,475,556 | 10/1969 | Sasaki et al. | 328/164 X |
| 3,564,411 | 2/1971 | Seidel | 328/164 X |

*Primary Examiner*—John W. Huckert
*Assistant Examiner*—L. N. Anagnos
*Attorney*—John E. Mowle

[57] ABSTRACT

A switching circuit for regenerating pulses in the repeater of a digital transmission system which utilizes an R-C compensating network to minimize base line wander resulting from low frequency cut-off in the input coupling network.

4 Claims, 2 Drawing Figures

REGENERATIVE SWITCHING CIRCUIT

This invention relates to a regenerative switching circuit and more particularly one which may be used to compensate for the low frequency cut-off in a digital transmission repeater.

BACKGROUND OF THE INVENTION

In a typical digital transmission system, a stream of pulses is transmitted down a coaxial line. Degradation of the signal results from attenuation along the line as well as pick-up of extraneous noise. Consequently, repeaters are employed at discrete intervals to regenerate the pulse stream. These repeaters utilize transformer or capacitor coupling which results in a low frequency cut-off. This a-c coupling allows the repeater to be powered by direct current which is carried along the coaxial line. In addition, it isolates the repeater from any low frequency noise on the line and provides improved immunity to damage caused by lightning. The effect of the low-frequency cut-off in the repeater on the pulse stream is base-line wander.

One technique for dealing with this is to restrict the allowable pulse patterns by use of coding or scrambling. Another technique is to use quantized feedback. Quantized feedback is an arrangement whereby the low-frequency components removed from the signal by coupling networks are replaced by low-frequency components in the regenerator output.

This technique is difficult to apply in high-speed digital repeaters; e.g. those operating in the range of 250Mb/s with pulse widths in the order of 3.5ns. In a typical system, the delay through such a regenerator is in the order of 4ns and consequently it is impossible to apply in-phase quantized feedback.

SUMMARY OF THE INVENTION

It has been discovered that the effective low frequency cut-off can be increased by an order of magnitude by providing in the regenerative switching circuit itself an offset which is proportional to the amount of droop introduced in the digital pulse stream due to the removal of the low-frequency signal components in the input coupling circuit, while retaining the advantages of a-c coupling outlined above.

Thus, in accordance with the present invention there is provided a regenerative switching circuit comprising a pair of emitter-coupled transistors having a common emitter resistance and separate collector resistances. A coupling resistor is connected between the collector of the input transistor and the base of the output transistor. This circuit includes a high-pass input network which may be of the type that includes a series connected coupling capacitor and a shunt connected input resistor both of which are connected to the base of the input transistor. Alternately, transformer coupling may be used in the input network. The circuit also includes a biasing network comprising a bias resistor and a capacitor connected in shunt with the base of the output transistor, the R-C time constant thereof being such as to substantially compensate for the low frequency roll-off of the high-pass input network.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
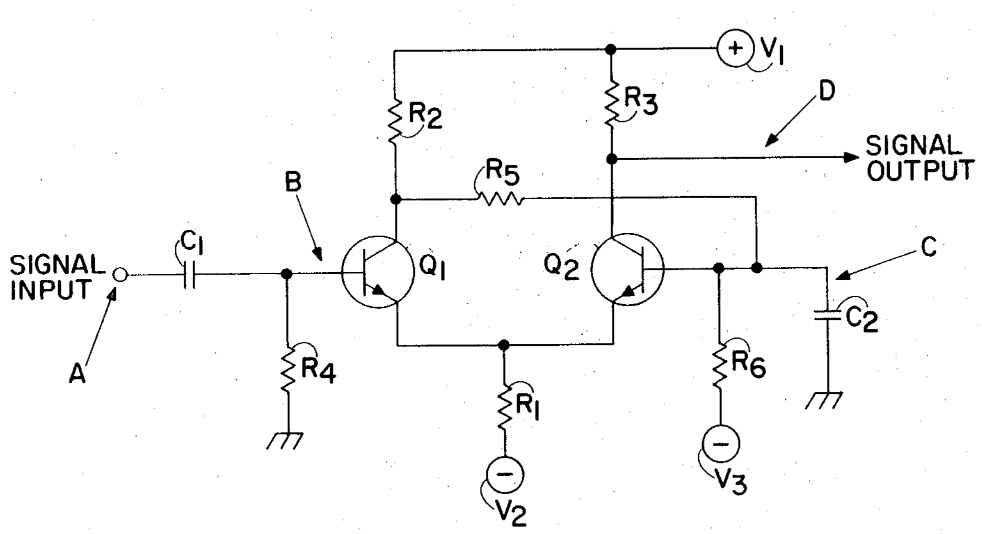
FIG. 1 is a schematic circuit diagram of a regenerative switching circuit in accordance with the present invention.

Referring to FIG. 1, the regenerative switching circuit comprises a pair of NPN transistors $Q_1$ and $Q_2$ connected in a common emitter configuration with their emitters connected through a common emitter resistor $R_1$ to a negative source of operating potential $V_2$. The collectors of the transistors $Q_1$ and $Q_2$ are connected through separate collector resistors $R_2$ and $R_3$ respectively to a positive source of operating potential $V_1$. A digitial pulse stream which is transmitted along a transmission line is serially coupled through an input coupling capacitor $C_1$ to the base of the transistor $Q_1$. The base of $Q_1$ is also connected through an input resistor $R_4$ to ground. The collector of the input transistor $Q_1$ is connected to the base of the output transistor $Q_2$ through a coupling resistor $R_5$. A bias resistor $R_6$ is connected between the base of the output transistor $Q_2$ and a negative source of bias potential $V_3$. A compensating capacitor $C_2$ is connected to ground in parallel with the bias resistor $R_6$. The output of the switching circuit is taken from the collector of the output transistor $Q_2$.

Figure 2:
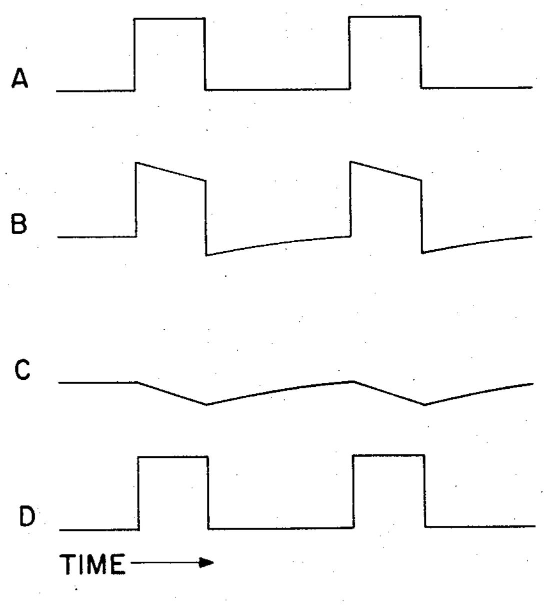
FIG. 2 illustrates a typical pulse stream at various points along the circuit illustrated in FIG. 1.

In the accompanying drawings, the locations of the typical waveforms illustrated in FIG. 2 are identified by corresponding reference characters A, B, C or D, in FIG. 1.

In operation, a digital pulse stream such as depicted in A of FIG. 2, is transmitted down a transmission line, thence coupled through the input coupling capacitor $C_1$ to the base of the transistor $Q_1$. In the absence of a positive-going signal, the base of the transistor $Q_2$ is maintained at a potential above the base of transistor $Q_1$ due to the potential divider formed by the resistors $R_2$, $R_5$ and $R_6$. Consequently the transistors $Q_2$ and $Q_1$ are conducting and non-conducting respectively. The resistor $R_1$, which couples the common emitters to the negative source, provides a substantially constant current source for the two transistors $Q_1$ and $Q_2$. The potential on the base of the transistor $Q_2$ may be defined as the threshold of the circuit since it is necessary to apply a signal to the base of the transistor $Q_1$ which is greater than this threshold in order to direct the current from the negative potential source through the transistor $Q_1$. Hence, any positive-going input signal which is greater than this threshold will cause transistor $Q_1$ to start conducting. This reduces the current through the transistor $Q_2$ which causes the voltage on its collector to rise thus giving a positive output signal as shown in D of FIG. 2. The threshold of the circuit may be adjusted by varying the bias potential from the source $V_3$.

The high-pass R-C input network, comprising capacitor $C_1$ and resistor $R_4$, causes the base-line of the incoming digital stream, which is applied to the base of transistor $Q_1$ to wander as shown in B of FIG. 2. The R-C time constant, which is principally formed by the resistor $R_6$ and the capacitor $C_2$, is such as to substantially compensate for the low frequency roll-off created by that of the input capacitor $C_1$ and the resistor $R_4$. Thus, the application of a positive signal at the input switches on the transistor $Q_1$, which reduces the current through the resistor $R_5$ and effectively reduces the threshold at a rate defined by the R-C time constant at the base of the transistor $Q_2$. This variation in the threshold at the base of the transistor $Q_2$ is illustrated in C of FIG. 2. The varying threshold substantially corrects for the base line wander created by the input coupling network so that the output signal from the collector of $Q_2$ is a substantially rectangular pulse stream. It will be appreciated that in an operating system, the input pulse stream would be badly degraded by dispersion and attenuation along the transmission line relative to that shown in A and B of FIG. 2.

In a typical 280Mb/s system, a low frequency cut-off of 20 MHz is used. Typical non-limiting values used in such a system are as follows:

| | |
|---|---|
| $C_1$ = 80pF | $C_2$ = 16pF |
| $R_1$ = 560Ω | $R_2$ = 240Ω |
| $R_3$ = 100Ω | $R_4$ = 56Ω |
| $R_5$ = 960Ω | $R_6$ = 290Ω |
| $Q_1$ = 2N5652 | $Q_2$ = 2N5652 |
| $V_1$ = 6v | $V_2$ = −6v |
| $V_3$ = −0.7v | |

The above-described principle may be applied to a bipolar regenerative switching circuit by utilizing two circuits identical to those shown in FIG. 1 and driving them by complementary inputs. The only other alteration is the addition of a pair of coupling resistors which are cross-connected between the base and collectors of the two output transistors $Q_2$.

What is claimed is:

1. A regenerative switching circuit, including low frequency compensation for a high-pass input coupling network forming part thereof, comprising:
   - first and second transistors having separate collector resistances and a common emitter resistance connected to opposed ends of a source of operating potential;
   - the base of the first transistor connected to the input coupling network and the collector of the second transistor connected to the output of the regenerative circuit;
   - a coupling resistance connected between the collector of the first transistor and the base of the second transistor;
   - a biasing resistance connected between the base of the second transistor and a potential point intermediate that of the ends of said source;

the improvement comprising:
   - a compensating capacitance connected in shunt with said bias resistance, the time constant thereof being such as to substantially compensate for the low frequency roll-off of said high-pass input coupling network.

2. A regenerative switching circuit as defined in claim 1 in which the high-pass input coupling network comprises:
   - a coupling capacitance connected in series with the base of said first resistance and an input resistance connected between said base and the intermediate potential point.

3. A regenerative switching circuit, for regenerating a pulse stream on a transmission line, comprising:
   - a pair of emitter-coupled transistors having a common emitter resistance and separate collector resistances;
   - a coupling resistance connected between the collector of one of said transistors and the base of the other;
   - a high-pass input network for coupling the input of said circuit to the base of said one transistor;

the improvement comprising:
   - a biasing network including a bias resistance and capacitance connected in shunt with the base of the other transistor, the R-C time constant thereof being such as to substantially compensate for the low frequency roll-off of said high-pass input network.

4. A regenerative switching circuit as defined in claim 3 in which the high-pass input network comprises:
   - a series connected coupling capacitance and a shunt connected input resistance connected to the base of said one transistor, the R-C time constant thereof being substantially equal to that of said biasing network.

* * * * *